Aug. 23, 1955  H. A. MILOCHE  2,715,922
METHOD AND APPARATUS FOR FORMING CABLES
Filed Nov. 17, 1949  4 Sheets-Sheet 1

INVENTOR
H. A. MILOCHE
BY
ATTORNEY

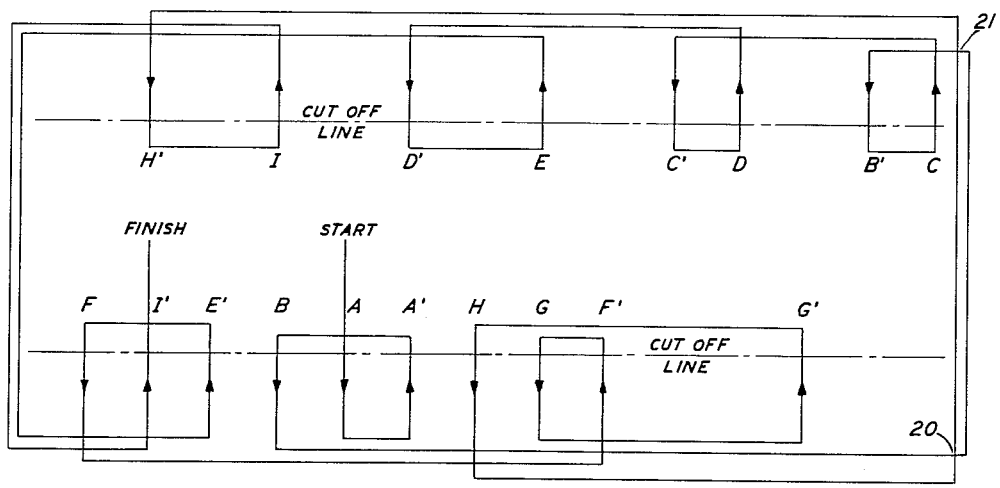
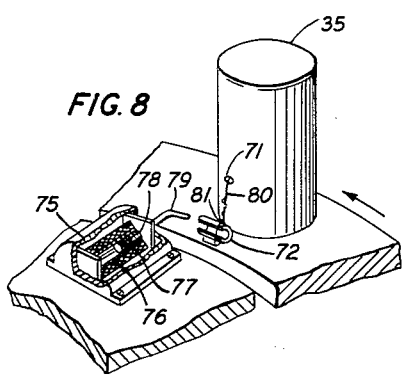
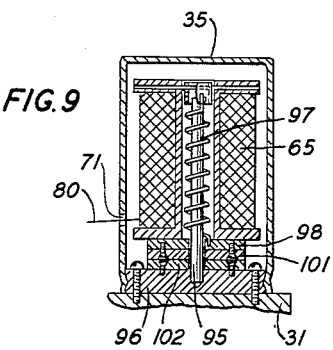
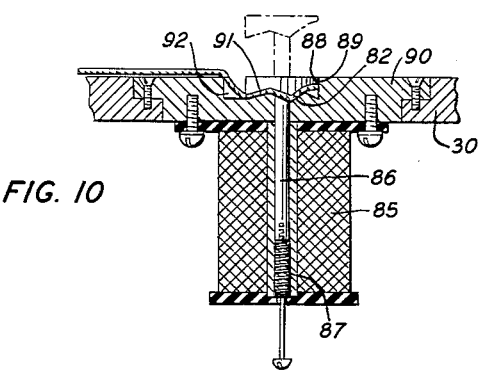

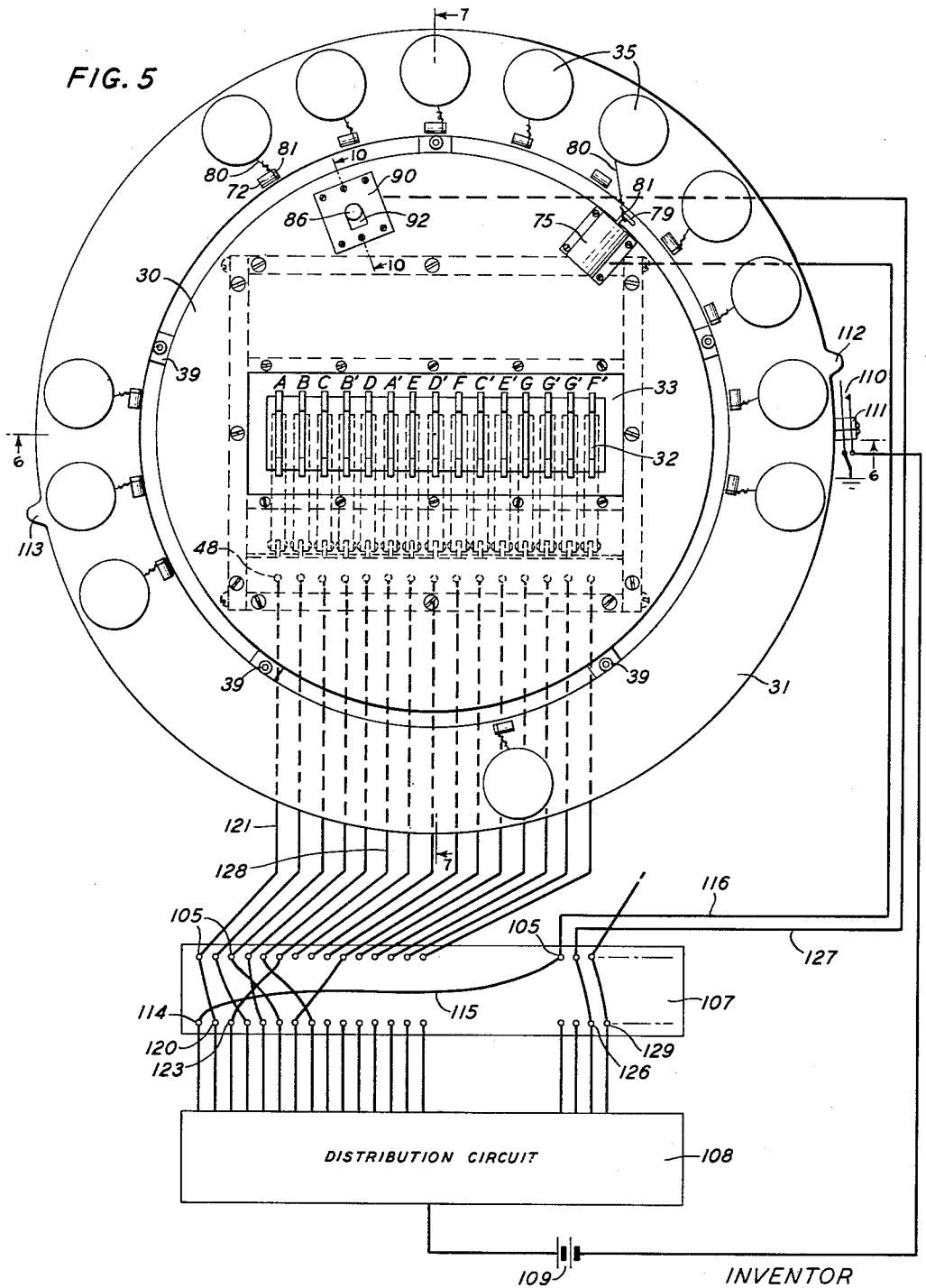

Aug. 23, 1955 H. A. MILOCHE 2,715,922
METHOD AND APPARATUS FOR FORMING CABLES
Filed Nov. 17, 1949 4 Sheets-Sheet 4

INVENTOR
H. A. MILOCHE
BY
ATTORNEY

United States Patent Office 2,715,922
Patented Aug. 23, 1955

2,715,922

METHOD AND APPARATUS FOR FORMING CABLES

Herman A. Miloche, Teaneck, N. J., assignor to Bell Telephone Laboratories, Incorporated, New York, N. Y., a corporation of New York Application November 17, 1949, Serial No. 127,807

16 Claims. (Cl. 140—71)

This invention relates to methods and apparatus for forming cables.

In manufacturing electrical apparatus, it is often necessary to interconnect various parts of the apparatus with conductors and for this purpose a number of strands of insulated conductors of various lengths are formed into a cable having leads therefrom leading to various parts of the apparatus. In the telephone art where these cables simply connect various pieces of electrical apparatus within one unit of a telephone instrument, exchange switchboard or the like, they are sometimes called "local cables" since they are formed from wire rather than sheathed cable to meet the particular conditions of the apparatus and circuit of the unit.

Local cables in some cases have heretofore been formed manually in the following manner: A full size chart or layout showing the exact contour of the desired cable is drawn on a table and nails are driven into the table at intervals, particularly at the points where the cable is to be curved or where a skinner is to extend from the cable for connection to a terminal of a piece of apparatus. The wire is then formed on the table about the nails. After all the wires have been laid the cable is sewed manually with cord using a wrap around stitch. The same chart and series of nails may be used to produce other similar cables.

One object of this invention is to facilitate the manufacture of local cable.

More particular objects of this invention are to provide local cable patterns which lend themselves to manufacture by machinery and to provide apparatus for producing such local cable.

In accordance with one feature of this invention, local cable is manufactured by utilizing a relative rotation in one direction between the strands making up the cable and a series of supports for the cable.

Another feature in the manufacture of local cable in accordance with this invention is the elimination of the nails or equivalent snags from the surface on which the cable is formed and the use of moveable snagging means which may be projected above the surface to engage the cable strands and subsequently retracted to remove those snags and the engaged portion of the strands from the work surface.

A further feature pertains to a cable making apparatus comprising a strand supply and a plurality of strand snagging means around which the supply rotates. Strands are thus drawn from this supply and swept across a surface from which the snagging means project at selected intervals in the sweep of the strand. Thus each strand forms a series of continued loops all extending in one direction of rotation and this pattern is converted to a cable form by sewing or tying the loops of all the strands together and cutting away a portion of each loop so that the remaining portions provide suitably positioned electrical connections.

Other novel features and advantages of this invention will become apparent from the following detailed description, when read with reference to the accompanying drawings, wherein:

Fig. 4 is the basic winding pattern of one strand of the local cable of Fig. 3;

Fig. 5 is a plan view of a machine set up for manufacturing a straight length of local cable of the type shown in Fig. 1, the controlling mechanism being only partially represented, in schematic fashion;

Fig. 8 is a partially broken away perspective of the strand supply spool and an initial snagging mechanism;

Fig. 9 is a detailed sectioned elevation of a strand supply spool; and

Fig. 10 shows the strand severing and terminating device in sectional elevation.

Figure 1:
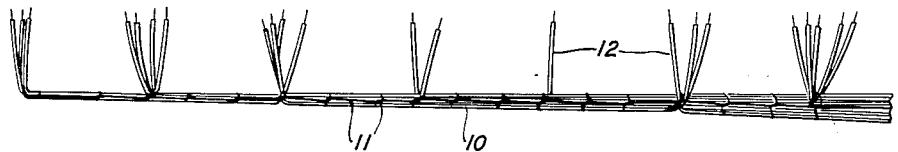
Fig. 1 is a plan view of a length of straight local cable.
Figure 2:
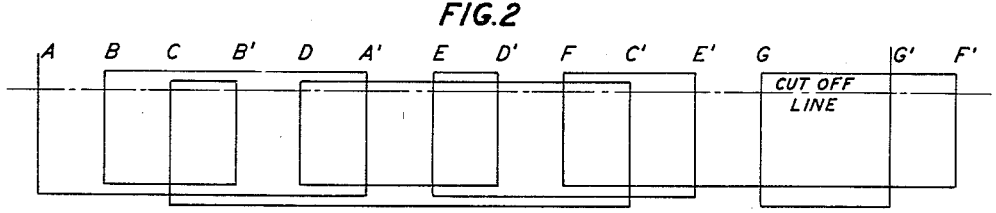
Fig. 2 is a basic pattern for one strand of the local cable of Fig. 1.
Figure 3:
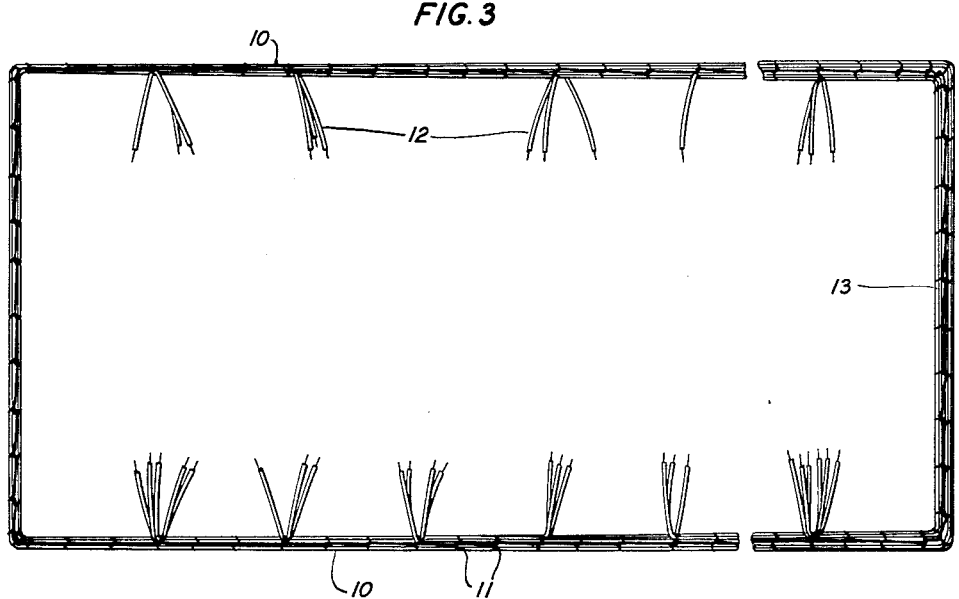
Fig. 3 is a plan view of a block or rectangular form of local cable.

Referring now to the drawings and particularly to Figs. 1 through 4, two forms of local cable are disclosed, namely, the straight form of Fig. 1 comprising a main portion 10 extending in a substantially straight line and made up of a plurality of strands sewed into a tight bundle with heavy thread 11, and a rectangular or block form, shown in Fig. 3, comprising essentially a plurality of rows of the local cable of Fig. 1 having parallel body portions 10 from which the skinners 12 or break-outs extend, the rows of body portions being connected by the side leads 13. Each of these patterns is made up of a series of strands each of which is wound continuously in one direction of rotation to produce a series of loops. In the case of the straight line type of local cable shown in Fig. 1 all loops have a common base line while in the block local cable of Fig. 3 the base line of the loops may be the sides of a rectangle as shown in Fig. 4.

To illustrate how a cable of the form shown in Fig. 1 might be made up, a pattern of one strand of that cable is shown in Fig. 2. To set up this pattern, it must first be known where the terminals of the equipment to be connected electrically are located. Let us suppose, for example, that one piece of equipment will have a terminal at the position A of Fig. 2, while a second piece of equipment will have a terminal at the position A'. Generally another terminal at position B is to be connected to a second terminal at position B' and so on throughout the pattern of this strand. After the terminal positions and desired interconnections have been ascertained a pattern may be set up as shown in Fig. 2 employing a continuous rotation of the strand supply in a single direction of rotation, counter-clockwise in this case, relative to the terminal positions. Thus to connect A to A' the strand may be secured at some point outside the pattern, and the supply rotated in a counter-clockwise direction around the member on which the cable is to be formed and snagged on properly positioned pins or other means so that the supply would draw a strand around snagging means at A and continuing in a counter-clockwise direction snag the strand around similar means at A', then to B, B', C, C' and so on until an entire pattern utilizing the particular strand has been made up. Then other strand patterns can be formed over the first utilizing some or all of the snags employed in forming the first pattern. When the desired number of connecting leads have been formed into the cable it is sewed along the lower longitudinal portion of Fig. 2 thus forming the bundled body represented at 10 in Fig.

1. At this stage the semiprocessed cable is in the form of a bundle of wire strands with a series of loops projecting out of the sides of the bundle and no means of connecting terminals. However, by cutting along the line labeled "cut-off line" in Fig. 2, a series of U-shaped lengths of conductor are produced the ends of which may be connected to the terminals of the equipment with which the cable is to be associated.

Similarly, the block or rectangular form of local cable of Fig. 3 may be made up of a series of strands each having a pattern exemplified by that shown in Fig. 4 connecting terminal A to A' in the manner discussed in regard to the straight type of local cable and point B to B' by a means which is a parallel of the above-disclosed method but employs a larger loop having an extra pair of snagging points. Thus, the strand in being carried in a counter-clockwise direction would snag at A' then B, snag point 20 at the lower right-hand corner of the pattern, snag point 21 in the upper right-hand corner of the pattern and then snag point B' in the snagging row above that in which the first snagging operations were accomplished. With a pattern such as that illustrated in Fig. 4 it is thus possible to multiple a connection in a single row or in two rows, and while a pattern is disclosed for only two rows the same method can be used to construct a third, fourth or more rows containing skinners or break out points 12 by using extra rows of snags.

Figure 6:
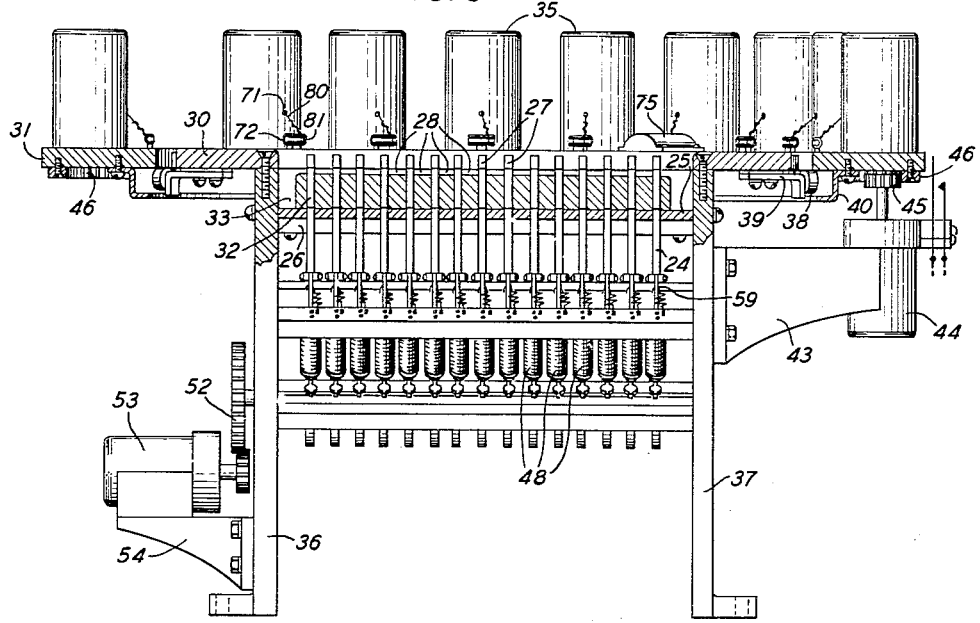
Fig. 6 is a sectional elevation of the machine of Fig. 5 taken along the line 6—6.
Figure 7:
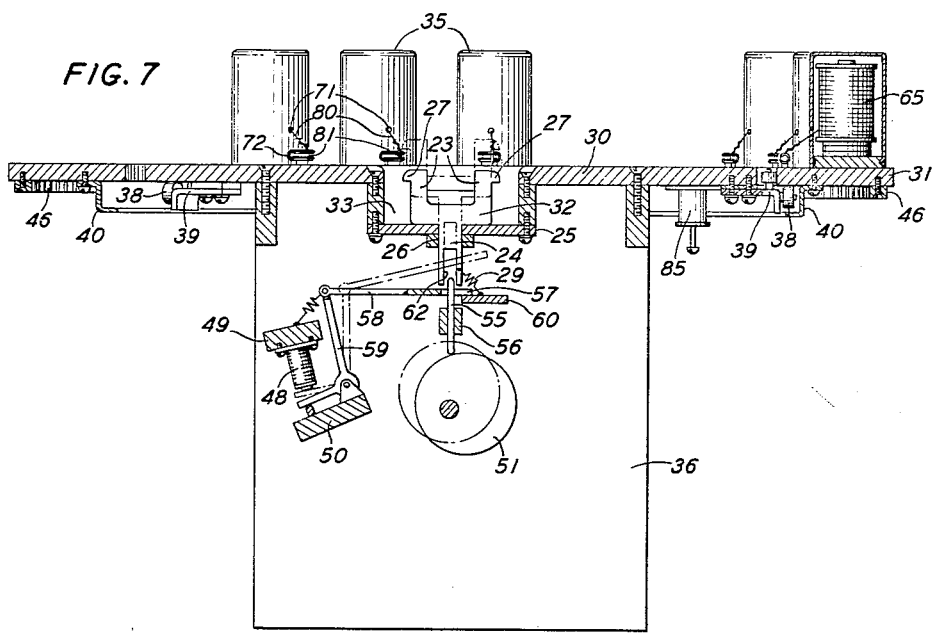
Fig. 7 is a sectioned elevation showing the detailed operation of the snagging mechanism of the machine of Fig. 5 taken along the line 7—7 of Fig. 5.

A machine for producing strand patterns of the type just discussed suitable for local cable is disclosed in Figs. 5, 6 and 7. It comprises a circular table 30 for receiving cable strands, surrounded by an annular table 31 carrying a supply of strands and feeding means therefor and arranged to rotate about the first table and in its plane. A plurality of selectively controlled snags 32 are located within a depression 33 in the surface of the table 30, and may be projected above the surface of the table to snag strands as they sweep across said surface. The annular table surrounding the stationary surface carries a plurality of cylindrical casings 35 containing strand supply spools from which may be drawn strands which, when fixed at a point on the surface of the table, will be swept across the surface by the rotation of the annular table 31. Thus, this machine operates by snagging one end of one of the strands and fixing it on the table surface while the supply spool is rotated about the table surface, and snags 32 are selectively projected from the surface in a predetermined manner. By operating on a plurality of strands it can build up a series of superimposed patterns similar to the type disclosed in Fig. 2 to form a local cable of the type shown in Fig. 1.

Considering the detailed structure of the machine, the table 30 is supported on a pair of legs 36 and 37 which also support the rotatable annular table 31 by means of the roller bearings 38, supported from brackets 39 on the under surface of the table 31, and riding in the race 40 on the under surface of the annular table 31. Driving means for the table 31 comprising a motor 44 driving a pinion 45 engaging the gear 46 secured to the under surface of the table 31 is also supported from the leg 37 by means of the bracket 43.

The aligned strand snags 32 each have a U-shaped body the arms 23 of which form a pair of spaced snags. Thus the depression 33 contains a pair of groups of aligned snagging arms 23 the tops of which are all normally below the surface of table 30. Integral with the U-shaped body of the snags and extending downwardly from the bight of the U is a leg 24 which extends through the plate 25 forming the bottom of depression 33 and is journaled in a suitably apertured bar 26 extending between the legs 36 and 37. Outwardly extending fingers 27 are provided on the ends of the snag arms 23 to insure positive engagement of the strands, which are pulled below the surface of the table 30 with their portions between the snag arms lying on the top of the segmented block 28 by the springs 29.

Individual actuating solenoids 48 for the snagging devices 32 are mounted beneath the table 30 on racks 49 and 50 extending between the legs 36 and 37. As may best be seen from Fig. 7, the snags 32 are driven from an eccentric shaft 51 which is driven through the gear train 52 by the motor 53 mounted by means of bracket 54 on leg 36. Shaft 51 in rotating causes the rods 55 associated with the individual snags 32 and journaled in the bar 56 extending between legs 36 and 37 to rise and fall. In rising the upper end of the shaft 55 passes through a slot 57 in the arm 58, which is pivoted on the end of the spring biased L-shaped relay armature 59 and rests on the bar 60 extending between the legs 36 and 37, and passes into the slot 62 in a lower portion of the downwardly extending leg 24 on the bottom of the snag 32. Thus, while the shaft 51 is synchronized with the rotation of the table 31 so that it rotates twice during each rotation of the table it merely causes the rods 55 to rise and fall without any effect upon the snags 32. In order to actuate one of these snags it is necessary to pass a current through its actuating solenoid 48 thus causing the armature 59 to rock in a clockwise direction to carry the arm 58 to the right in Fig. 7, so that the upper end of pin 55 can no longer pass through the slot 57 in that arm but rather engages the body of the arm forcing it upward to engage and raise the leg 24 and thus its associated snag 32.

As may best be seen from Figs. 7, 8 and 9 each strand supply reel 65 is mounted within a casing 35 on the table 31. A strand end 80 projects from an aperture 71 forming a strand feeding means in the wall of the casing and is terminated in the form of a loop 81 which is secured over a split sleeve 72 mounted on the inner periphery of table 31 to provide means for initially snagging the strands.

The strands are initially snagged on table 30 by an electrically actuated snag which is mounted on the periphery of the table so that when current is passed through the solenoid 76 the armature 77 is projected outwardly from the casing 75 against the pressure of the spring 78 and if the table 31 is rotating the bent finger 79 on the end of armature 77 enters the sleeve 72. As the table 31 continues to rotate finger 79 slides through slot 73 in the sleeve and snags the loop 81 on the end of strand 80 pulling it off sleeve 72 and thereby fixing the end of the strand to the table 30.

Further rotation of table 31 around table 30 sweeps the strand over the surface of table 30 and over the recess 33 containing the snags 32. The solenoids 48 are operated in the desired order and in synchronism with the movement of the strands, as will be set forth hereinafter, to snag the strands in the proper pattern.

After each strand pattern is completed the strand 80 is severed and the severed end 82 is fixed in its position by the device disclosed in section in Fig. 10. The strand terminator is a solenoid actuated shear which in the non-operated condition is in the surface of table 30, but which upon actuation by the passage of current through solenoid 85 causes armature 86 to rise against the pressure of spring 87 to snag the strand 80 as it is swept over that portion of table 30. When the current is removed from solenoid 85, spring 87 causes the shear to drop down into the surface of table 30 again and shear the strand 80 between the shearing edge 88 on the end of armature 86 and the shearing edge 89 on plate 90 set in the table surface. An irregular surface 91 is provided on the under portion of the armature end and the irregularities of that surface register with complementary irregularities in the depression 92 in plate 90 to provide a gripping means for the strand end.

After a strand has been severed, the free end is drawn into its strand spool casing 35 through the aperture 71 by the retraction device disclosed in Fig. 9 to prevent fouling of the mechanism of the machine. This is accomplished by a spring and clutch arrangement on the shaft supporting the strand supply spool 65. The spool 65 is keyed or otherwise secured to a shaft 95 which is journaled in a base plate 96 secured to the table 31. A retracting spring 97 loosely wound around the shaft 95 is fastened at its upper end to the shaft and is secured at its other end to a plate 98 concentric with the shaft and rotatable relative thereto. A clutch is provided between the plate 98 and the base plate 96 in the form of disc facings 101 and 102 secured to the respective plates by suitable means such as screws. This friction clutch permits a limited slipping between plate 98 and plate 96; thus, while the strand is being drawn from the spool 65 the spool first rotates relative to the plate 98 tightening the retracting spring 97 and then when spring 97 is completely tightened slippage occurs between the clutch faces 101 and 102 to permit the spool to rotate further. When the tension is removed from the strand 80 as by severing at the faces 88 and 89 the plate 98 immediately becomes stationary relative to the plate 96 and the spring 97 unwinds to rotate the spool 65 and rewind the strand 80 thus drawing it into the casing 35.

A synchronized control circuit is provided for operating the primary snags, the pattern snags, and the severing device in the proper sequence to build up predetermined strand patterns. Synchronization of this circuit is obtained by mechanically coupling it to the rotation of the table 31 by way of a switch 110 which is shown mounted on a bracket 111 supported on the casing of motor 44 so that the contacts are closed by a pair of protuberances 112 and 113 on the opposite ends of a diameter of the table 31. When this contact is closed, it completes a circuit from an energy source such as battery 109 through ground to a distribution circuit 108 which has a series of terminals connected to a corresponding series of jacks in a plug board 107. Each impulse from switch 110 actuates a stepping means in distribution circuit 108 to switch the energy from one terminal of that circuit to the next adjacent terminal. This applies energy successively to the jacks 114, 120, 123 and so on of plug board 107. The plug board is also provided with jacks 105 to which are connected the leads from the various controlling solenoids so that jumpers such as lead 115 can be connected between the jacks from the distribution circuit terminals and jacks 105 thereby applying energy in successive periods to any of the controlling solenoids. Thus, in the case illustrated in Fig. 5, where the impulses into the distribution circuit energize first jack 114, then jack 120 to its right, and so on, a pattern of the form shown in Fig. 2 will be made by the machine.

Tracing the operation of the machine through the first few operations in the formation of the strand pattern of Fig. 2: during the first half revolution of table 31, protuberance 112 closes contact 110 to cause an impulse to be applied to the distribution circuit thus energizing terminal 114, which in turn is connected by tthe jumper or cross-connecting lead 115 on the plug board to lead 116 extending to the snag 75. The energization of snag 75 causes hook 79 to engage a loop 81 on the end of a strand 80 projecting from a supply spool housing 35. In the next half revolution of table 31, protuberance 113 closes contact 110 to cause an impulse to be applied to terminal 120 which is cross-connected on the plug board to lead 121 extending to the snag actuating solenoid 48 in position A as disclosed in Fig. 2. In the following half revolution, protuberance 112 again closes contact 110 to apply energy to terminal 123, which is connected through lead 124 to the solenoid 48 in position A' and so on until the pattern is completed. At the completion of the pattern, the terminal 126 of the plug board is actuated to energize the severing solenoid 85 through lead 127, thus snagging and cutting off the end 82 of strand 80. The next impulse from switch 110 actuates terminal 129 which is connected to an initial snag similar to snag 75 to initiate another strand pattern to be formed in a manner similar to that disclosed. This process is repeated until the desired number of strands is built up on the snags at which time the rotation of table 31 is stopped and the main bundle of the local cable is sewn as shown in Fig. 1.

As set forth heretofore, each of the snags 32 is provided with a pair of spaced fingers 27, which extend at right angles to the snag body to insure a positive engagement of the strands by the snag and to permit the strands to be drawn into the depression 33 in the table surface when the snag is retracted by spring 29 and thus keep the table surface clear. These fingers 27 at the completion of the local cable prevent its removal and while the snags remain in the depression 33, it is rather difficult to either sew the cable or cut the waste material, i. e., that material lying above cut-off line of Fig. 2, away to complete the cable; therefore, it is advantageous to actuate all relays in the snagging bank and rotate the shaft 51 to lift the snags so that they all project above the surface of the table 30. Then the cable can be conveniently sewn and the waste material cut away to permit removal of the finished cable.

While only one strand pattern is set up on the machine of Fig. 5, it is to be understood that a cable would be made up of a plurality of strands and the distribution circuit and plug board would be expanded accordingly, the various snags being reused for the subsequent strands in any desired order. Further, it is to be understood that the same form of machine is adapted for using more than one row of snags to form a block or rectangular cable pattern as disclosed in Figs. 3 and 4.

A number of mechanical modifications fall within the scope of this invention including cable making machinery wherein there is relative rotation between a strand receiving element and a strand feeding element, as for example, a machine having a stationary strand supply and a strand feeding means which travels around the strand receiver or a machine in which the strand receiver rotates relative to a stationary strand supply and strand feed.

It is to be understood that the above-described arrangements are illustrative of the application and principles of this invention. Numerous other arrangements may be devised without departing from the spirit and scope of this invention.

What is claimed is:

1. In the process of forming local cable the steps which comprise fixing one end of a strand, carrying the strand around a strand receiving device in a single direction of rotation, sweeping strands of the cable a plurality of times over the same substantially plane path parallel with the surface of the strand receiving device, securing the strand at selected points on said strand receiving device, and moving the secured portions of the strand out of the path of successive sweeps of the strand.

2. In the process of forming local cable the steps which comprise sweeping a strand of the cable a plurality of times over the same substantially plane path parallel with the surface of a strand receiver, snagging the strand at selected locations on said strand receiver, and moving the snagged portions of the strand out of the path of successive sweeps of the strand.

3. In the process of forming local cable the steps which comprise sweeping a strand of the cable a plurality of times over the same substantially plane path parallel with a strand receiving surface, snagging the strand at selected locations on said surface, and drawing the snagged portions of the strands below said strand receiving surface.

4. The method of forming local cable which comprises sweeping strands of the cable a plurality of times over the same substantially plane path parallel with the surface of a strand receiver in a single direction of rotation, snagging said strands at selected locations in a series of pairs of aligned locations on said strand receiver to form a series of substantially rectangular loops all having one side in a substantially straight line, moving each snagged strand out of the path of successive strand sweeps securing an aligned side of each loop to a juxtaposed aligned loop side, severing each loop at a point spaced from said aligned side, and removing the strands from the strand receiver.

5. The method of forming local cable which comprises sweeping strands of the cable a plurality of times over the same substantially plane path parallel with the surface of a strand receiver in a single direction of rotation, snagging said strands on selected snags of a plurality of pairs of rows of aligned snags to form a series of substantially rectangular loops all having a side in one of a plurality of substantially straight parallel lines, moving each snagged strand out of the path of successive strand sweeps, securing a side of each loop to a juxtaposed aligned loop side, severing each loop at a point spaced from said secured side, and removing the strands from the strand receiver.

6. A cable forming apparatus comprising a strand receiver, a strand feeder, means causing relative rotation between said feeder and said receiver, to sweep a portion of a strand across said strand receiver, a plurality of snags associated with said strand receiver, means for selectively projecting individual snags into the path of a strand as it is swept across said strand receiver to fix the position of the strand on said strand receiver, and means for withdrawing said snags and the snagged portions of the strand from the path of successive sweeps of said strand.

7. A cable forming apparatus comprising a strand receiving means, a strand feeding means rotatable about said strand receiving means, driving means for rotating said strand feeding means about said strand receiving means to sweep a portion of a strand across said strand receiving means, a plurality of snagging devices associated with said strand receiving means, means for successively projecting said snagging devices individually from said strand receiving means into the path of said strand to fix the position of said strand on said strand receiving means, and means for withdrawing said snagging devices and the snagged portion of said strand out of the path of successive sweeps of said strand.

8. A local cable forming apparatus comprising a strand receiving means, a strand feeding means, means causing relative movement between said strand receiving and said feeding means to sweep a portion of a strand across said strand receiving means, a plurality of snags associated with said strand receiving means, electrically controlled means for selectively projecting individual snags from said strand receiving means into the path of said strand to fix the position of said strand on said strand receiving means, and means for withdrawing said snags and the snagged portion of said strand out of the path of successive sweeps of said strand.

9. A local cable forming apparatus comprising a table for receiving a plurality of strands, means feeding strands to said table, means moving strands from said strand feeding means relative to said table to sweep the strands across said table, a plurality of snags associated with said table, means for selectively projecting individual snags from the surface of said table into the path of a swept strand to fix the position of the strand on said table, and means for withdrawing said snags and the snagged portion of the strand out of the path of said successive sweeps.

10. A local cable forming apparatus comprising a strand receiving means, a strand feeding means, means moving said strand feeding means with respect to said strand receiving means, a plurality of individually movable snags on said strand receiving means for engaging and snagging strands from said feeding means, means controlling the movement of said snags in accordance with the movement of said strand feeding means to engage the strands, and means for withdrawing said snags and the strand portions engaged thereby below the surface of said strand receiving means.

11. A local cable forming apparatus comprising a table, a plurality of snags extensible above the surface of said table, a strand feeding means movable relative to said table, means for moving said strand feeding means, means selectively controlling the movement of each of said snags on said table relative to the movement of said strand feeding means to engage and fix the position of a strand on said table, and means for withdrawing said extended snags and the strand portions engaged thereby below the surface of said table.

12. A local cable forming apparatus comprising a table having a depression in its surface, a plurality of snags in the depression and arranged to be projected above said table surface, means responsive to electrical signals for projecting each of said snags, a strand carrier surrounding said table and arranged for rotation relative thereto, driving means for rotating said strand carrier relative to said table, a plurality of strand feeding devices on said carrier, a switch actuated by the rotation of said carrier to produce electrical signals, a distribution circuit associated with said switch, and connections from the terminals of said distribution circuit arranged for connection with any of said electrically responsive means whereby the snags may be projected above said table surface in any predetermined pattern to engage and fix the position of strands.

13. The method of forming local cable which comprises sweeping strands of the cable a plurality of times over the same substantially plane path parallel with the surface of a strand receiver, securing the strands at selected points on the strand receiver, moving the secured portions of the strands out of the path of successive strand sweeps, securing adjacent portions of the strands together, severing the individual strands at points spaced from the secured adjacent portions, and removing the strands from the strand receiver.

14. The method of forming local cable which comprises successively individually sweeping a plurality of strands of the cable a plurality of times over the same substantially plane path parallel with the surface of a strand receiver, securing the strands at selected points on the strand receiver, moving the secured portions of the strands out of the path of successive strand sweeps, securing adjacent portions of the strands together, severing the individual strands at points spaced from the secured adjacent portions, and removing the strands from the strand receiver.

15. A local cable forming apparatus comprising a table having a depression in its surface, a plurality of snags in said depression arranged to be individually projected above said table surface, a strand carrier surrounding said table and arranged for rotation relative thereto, a plurality of strand feeding devices on said carrier, means for rotating said carrier relative to said table, means for projecting individual snags above said table surface in a predetermined sequence and in accordance with the rotational position of said carrier relative to said table to snag portions of a strand fed from one of said feeding devices, and means for retracting the snags and the snagged strand portions into said table depression.

16. A local cable forming apparatus comprising a table having a depression in its surface, a plurality of snags in said depression arranged to be individually projected above said table surface, a strand carrier surrounding said table and arranged for rotation relative thereto, a plurality of strand feeding devices on said carrier, means for selecting a particular strand from said strand feeding devices for incorporation into said cable, means for fixing said selected strand with respect to said table, means for rotating said carrier relative to said table to sweep said selected strand across said table, means for projecting individual snags above said table surface in predetermined sequence and in accordance with the rotational position of said carrier relative to said table to snag portions of said strand, and means for retracting the snags and the snagged strand portions into said table depression.

References Cited in the file of this patent

UNITED STATES PATENTS

| Number | Name | Date |
|---|---|---|
| 1,379,755 | Francis | May 31, 1921 |
| 1,396,033 | Francis | Nov. 8, 1921 |
| 1,572,650 | Haft | Feb. 9, 1926 |
| 1,616,111 | Cardwell | Feb. 1, 1927 |
| 1,823,680 | Curtiss | Sept. 15, 1931 |
| 1,833,010 | Willy | Nov. 24, 1931 |
| 1,866,250 | Curtiss | July 5, 1932 |
| 2,013,764 | Putnam | Sept. 10, 1935 |
| 2,146,868 | Wensley | Feb. 14, 1939 |
| 2,154,595 | Weirch | Apr. 18, 1939 |
| 2,206,627 | Borkey | July 2, 1940 |
| 2,219,887 | Bowly | Oct. 29, 1940 |
| 2,393,548 | McCoy | Jan. 22, 1946 |
| 2,427,508 | Raspet | Sept. 16, 1947 |
| 2,437,309 | Veatch | Mar. 9, 1948 |
| 2,445,109 | Ferguson | July 13, 1948 |
| 2,445,937 | Carpenter | July 27, 1948 |